United States Patent
Jansson et al.

(10) Patent No.: US 7,718,195 B1
(45) Date of Patent: May 18, 2010

(54) PROCESS FOR SEPARATING LIPIDS AND PROTEINS FROM BIOLOGICAL MATERIAL

(75) Inventors: Stig Jansson, Sildråpeveien (NO); Edel Elvevoll, Grimsbyveien (NO)

(73) Assignee: Denofa AS, Gamle Fredrikstad (NO)

( * ) Notice: Subject to any disclaimer, the term of this patent is extended or adjusted under 35 U.S.C. 154(b) by 0 days.

(21) Appl. No.: 09/807,704

(22) PCT Filed: Oct. 21, 1999

(86) PCT No.: PCT/NO99/00321

§ 371 (c)(1),
(2), (4) Date: Jul. 25, 2001

(87) PCT Pub. No.: WO00/23545

PCT Pub. Date: Apr. 27, 2000

(30) Foreign Application Priority Data

Oct. 21, 1998  (NO) ................................. 19984896

(51) Int. Cl.
*C12P 21/06* (2006.01)
*A61K 36/00* (2006.01)
*A61K 35/60* (2006.01)
*A61K 35/12* (2006.01)

(52) U.S. Cl. ...................... 424/523; 424/524; 424/725; 424/776; 435/68.1

(58) Field of Classification Search ................. 435/68.1
See application file for complete search history.

(56) References Cited

U.S. PATENT DOCUMENTS 4,713,335 A * 12/1987 Keyes ........................ 435/183

FOREIGN PATENT DOCUMENTS

| NO | 933009 | * 12/1994 |
| NO | 9303009 | * 12/1994 |

OTHER PUBLICATIONS

Linus Pauling, College Chemistry, An Introductory Textbook of General Chemistry, Third Edition, W.H. Freeman and Company, pp. 732 and 733.

* cited by examiner

*Primary Examiner*—Christopher R Tate
*Assistant Examiner*—Randall Winston
(74) *Attorney, Agent, or Firm*—Ladas & Parry LLP

(57) ABSTRACT

A process for separating non-denatured fat and lipids as well as non-denatured proteins from a material of organic origin is disclosed wherein the fat and proteins are separated at a temperature below the denaturing temperature for the proteins to conserve their biological function and nutritional value.

2 Claims, No Drawings

PROCESS FOR SEPARATING LIPIDS AND PROTEINS FROM BIOLOGICAL MATERIAL

The present invention relates to a process for separating and producing a material being of an organic biological origin and containing lipids and proteins, especially separating and producing such a material from aquatic organisms, e.g. fish. The present invention is especially concerned with producing oil and lipids from vegetables and/or fish and/or other animals wherein the oil, lipids and/or fat contains a larger amount of non-degraded proteins and other essential materials (vitamins, bio-bound nutritionals, poly-unsaturated fats etc).

It is previously known methods for producing and separating different materials from living organisms. Among these it may be mentioned the production of fat and oils from fish, mammals and plants, the production of proteins and proteinaceous material from animals and plants, the production of dyes, vitamins etc. from animal and plant materials, etc.

Among the techniques being closest to the present invention is the process being disclosed in NO patent application no. 1993 3009 wherein it is disclosed a method for producing oils with a high oxidative stability from marine raw materials. In this previously known process for the raw material is frozen rapidly with a freezing rate of >1° C./min. and is processed in a frozen condition, whereafter the fat is separated with a gentle heating and by the fat being melted from the raw material. In this patent it is disclosed how the freezing of the raw material is done to conserve the oil quality being wanted in the end product, and what parameters are active in such a process. However, not much is indicated concerning the indicated slow heating of the material for melting the fat and oils from the starting material.

It is previously also known similar methods for producing oil, e.g. through NO patent 43.956 and 38.027. Thus it is known from NO patent to freeze fish liver and thaw this in a per se known manner followed by a separation of the oil for producing fish oil. Likewise it is known from NO patent 38.027 to freeze fish liver and thaw this in a per se known manner followed by separation of the oil for producing fish oil. Likewise it is known from NO patent 38.027 to freeze fish liver to rupture the liver cells and thus make the fish oil, after thawing, separable from the other material. In none of these patents it is indicated anything about how the thawing is to be performed and neither anything about the effects that the thawing process will have on the thawed material.

The present invention is an inventive development of the methods being disclosed in the above indicated patents/patent applications and which the present invention also may use for producing and separating material which is of a biological origin and which contains lipids and proteins. The purpose of such a separation is to produce an oil with a content of fat/oil (lipids) together with proteins being present in their natural condition, i.e. not being denatured. The purpose of this is that the fat/oil fraction in different biological materials contains substances being of a great nutritional and medical importance, and it is consequently of great consequence to avoid denaturation of such components when separating fat/oil from the biological material. The is relevant for animal material (marine and non-marine) as well as vegetable material, and among vegetable material it may in this connection be mentioned separation of oil from soy, olives, sunflower, corn, etc.

Since separation of oil from marine material in one of the separation forms which lies closest to the present invention, effects of heating in traditional separation of marine oils will be considered.

The current methods for separating cod liver oil comprise heating cod liver by using water steam to the extent that the cell structure is damaged and the proteins are denatured. This heating of the raw material leads to the cod liver oil, being non-miscible with water, floating to the surface and it is then separated from the aqueous material by centrifuging, pressing, floatation of decanting.

Fish oil is produced as a bi-product in the production process of fish meal. The quality of the oil reflects this as well. The process for producing oil starts with wet-pressing of the raw material. The raw material is treated with heat by heating this to between 70-90° C., and this denatures the proteins being present in the material. However, the fat/oil is liberated in this process. The fat/oil may then be separated by the methods indicated supra. It has been possible to reduce the time that the raw material is subjected to this heating, and it has thus been possible to improve the quality of the product, but nevertheless it has been necessary with such a steam treatment to separate out the wanted lipids.

In addition to the proteins becoming denatured by the heat treatment, other components such a thermal labile anti-oxidants, pro-oxidants, enzymes and fatty acids of longer chains and/or with a large degree of non-saturation become partly or completely destroyed in such a heat process as indicated supra. In addition the supply of large amounts of energy brings about activation and high reaction rates in the material such as auto-oxidation, photo-oxidation, enzymatic oxidation and polymerization.

Heat treatment causes also activation of oxidation reactions either purely thermal or through the reduction of the content of thermolabile anti-oxidants. A too strong heating has also the result that natural substances contributing to making the material stable towards becoming rancid, are inactivated. By heating the material, and thereby denaturing the proteins, metal ions will also be liberated. Examples are ferritin and haemoglobin which when denatured, liberate iron. Ions of transition metals, e.g. iron ($Fe^{3+}$) and copper ($Cu^{2+}$) are examples of strong pro-oxidants contributing to a faster oxidation of the fat and thus a poorer stability.

Techniques avoiding heating the material to any substantial degree, have also been used for the separation of oil and fat. This is especially true for so-called "cold-pressing" at about 30-50° C. of vegetable oils from vegetable material after a mechanical treatment of the material, but here the material has not previously been subjected to a freezing process. "Cold pressing" has also be done when separating cod liver oil, but here the fat often is, in addition to the moderate heating, is subjected to temperatures about 90° C. to make the process more effective in a subsequent separation step.

The goal for the present invention is to produce a lipid/proteinaceous product with as little denaturing as possible of the product's components, where the process contributes with the stabilisation of the product, i.e. exposes it to as little oxidative stress as possible, and at the same time avoids adding air (oxygen) and liberating pro-oxidants such as metal ions, and wherein the temperature may be kept low (under the denaturing temperature for the proteins in the biological material) and where the process may be performed in darkness to avoid photo-oxygenation of the material. Additionally it may be possible to perform the process according to the present invention under an inert atmosphere (e.g. under nitrogen or argon) or in a vacuum to avoid oxidation of the lipids, proteins or trace elements in the treated biological material.

The heating of the material by the process according to the invention may be done with any conventional heating apparatus suitable for avoiding any substantial denaturing of the treated material during the heating process. As examples of such heating processes it may be mentioned heat exchanging, microwave heating, infra red light heating, electric heating or any other mild heating process.

The process according to the invention has as its starting point a material of an organic biological origin (fish liver, whale blubber, soy beans, olives, sunflower seed, corn, microorganic material (yeast, bacteria, cell culture material etc.) containing lipids and proteins. An optional staring material is such a material as indicated supra have been pre-treated to weaken or rupture to cell walls. Such a treatment may be done with enzymes (e.g. cellulase, collagenase, lysozyme etc.) and/or with surfactants and/or with solvents (e.g. hexane) and/or with emulsion-bursting compounds or compositions (e.g. salt solutions) and/or emulsion-inhibiting solutions etc. Such treatment may be used to improve the yield of cellular materials or components (fat and of proteins) by rupturing the cell wall to liberate the cell components such as fat.

This material is frozen to a low temperature. The freezing temperature is not critical, but it lies in such an interval that the membranes surrounding the cells in the frozen material become "brittle" and rupture to liberate the contents of the cells. Normally it will be sufficient to freeze the material to a temperature within the interval 0° C. to −10° C., more preferred 0° C. to −6° C., even if other temperature intervals are possible, e.g. temperatures from −3° C. to −50° C., preferably −5° C. to −28° C. The freezing ratio (speed) may be relatively rapid, preferably over 1° C./min, even if this is neither of any significant importance for the process according to the present invention.

Without being limited by theory, it is presumed that the consequence of freezing is focused about a repacking of the membrane lipids. For the depot fat in biological material, which mainly comprises triglycerides, the freezing has no significant consequences, other than the volume in the fat vacuoles shrinking with about 10%. For the membrane lipids, however, the repacking by freezing may directly damage the membrane structure. In membranes, which in their original form has a liquid heterogenous structure of phospholipids, the freezing gives rise to a phase separation where the phospholipids are crystallised out as separate "islands" in the membrane. This phase separation is not reversible and the changes affect the membrane's function after thawing. In a frozen condition water, fat and tissue (cells) will for a solid, rigid structure. This rigid structure is ice crystals, cell membrane and fat vacuoles is exploited in a mechanical preparation of the frozen tissue. The elasticity of the cell membrane in a frozen condition is gone, and it is not possible for the tissue in a frozen condition to distribute forces being supplied thereto. Supplied external forces will thus be sufficient to crush the tissue so that the oil may be extracted be a moderate heating. In a rapid freezing, the used freezing time for the tissue will, as mentioned supra, advantageously be cut, and the lipids and proteins will be exposed to the fewest possible attacks of oxidative substances being present in the material.

Additionally, in a slow freezing fewer cores, and thus larger ice crystals, will be formed. After a while the salt concentration in the cells will become so high that this in itself has pro-oxidative properties. An increased enzyme activity is shown in the temperature interval for the forming of ice (−2° C. to 0° C.). This is also a reason for it being preferred that the freezing process for the biological material is made as small as possible to obtain stable oils of high quality from the biological material. According to the present invention the raw material is not subjected to temperature conditions wherein unwanted taste and colour substances are dissolved in the fatty phase or which destroy the natural anti-oxidants. This is achieved by the raw material first being frozen rapidly so that the water in the material forms many small ice crystals and the cell membranes and other cellular components are kept in a solid, rigid structure. After freezing the raw material is treated mechanically, e.g. by cutting, milling, scraping, pounding or in any other way. This increases the surface area of the frozen material so that a separation of the lipids, after a moderate heating, may be separated from the rest of the biological material. It is preferred, but not necessary, that the mean particle diameter after the cutting/grinding does not exceed 50 mm, an preferably does not exceed 25 mm.

The thawing of the material may proceed either by thawing the material in an oven or by supplying microwaves or in any other conventional way. The requirement is that the thawing does not denature the proteins in the lipid phase.

As a special consideration the origin of the relevant organic material will have to be taken into account.

Proteins from e.g. cold water fish species have been shown to denature at as low a temperature as 25° C. The normal physiological functional temperature for these species is about 10-15° C. or less. This means that the fish have their proteins and the melting temperature of their fat especially adapted to this temperature. Fish from temperate waters have a considerably higher denaturing temperature of their corresponding substances.

This means that for any kind of organic material one has to find where the denaturing starts to obtain the best possible effect of separation with the process according to the present invention.

Viscosity measurements of ground, whole frozen liver from cod shows that a denaturing starts already at about 40° C. The same result was found for the proteinaceous phase separated by the process according to the present invention. The viscosity decreased from 10° C. to 40° C. for the proteinaceous phase and increased thereafter to above 80° C. The oil per se decreases in viscosity from 10° C. and up to 50° C. and above.

Accordingly it is important for the efficiency to have as high a temperature as possible without harming the functionality of the proteins. This depends on which function or use of the proteins that is wanted.

At a temperature of over 30° C. it becomes difficult to separate the liver mass and this is on account of the nature of the material.

What happens in the liver mass may actually be observed. The structure of the proteins is held together partly by "sulphur bridges" and partly be hydrogen bonds (Van der Waals forces) forming across the proteins' structure from protein "strand" to protein "strand" and also to other types of cellular components. The consequences of the heating is that when heat energy is supplied, the motional energy (rotational and translatory energy) of the molecules increases. When the energy of motion surpasses the Van der Waals forces, the original structure of the proteins will change and start to move and rearrange itself. The proteins will now start to bunch and stick to surfaces and partly form new hydrogen bonds at other and completely random locations. This makes the separation difficult. The fat will in a way become emulsified by the long collecting arms of the proteins in this phase.

In cod liver it is about 25-30% water and only 6-8% protein and about 60-70% oil. When the temperature increases slightly more water becomes separated from the protein. The emulsifying action increases and it becomes even harder to perform a separation.

When using the process according to the present invention it is accordingly important to avoid that three phases are formed, i.e. a proteinaceous phase, free water and oil. A three phase separator is only able to handle 2 liquid phases and in a case where water is formed freely there will rapidly be formed an emulsion.

When the temperature reaches the interval 55-95° C., the proteins start to agglomerate to small protein clusters. Water may only bind in small quantities to these protein clusters which have formed. This causes the surface area and the density of the proteins to increase and the particle diameter to increase. Simultaneously the difference in specific weight between water and oil is significantly larger at such elevated temperatures than at lower temperatures, and this makes a further separation easier to perform, something which may account for the fact that most prior art separation is performed at elevated temperatures.

What is lost at such high temperatures are important thermolabile components such as retinol (vitamin A) and other important trace elements such as natural anti oxidants etc. The functional properties of the proteins are lost through denaturing.

On the other hand the proteins from the protein phase obtained by the process according to the present invention, may be concentrated and isolated, and they may be used as functional proteins in the nutritional industry and the pet food industry to bind fat and have also other functional tasks.

The oil from the process according to the present invention may, when it is refined and deodorized, or when it is in some other way treated so that its taste becomes neutral, be used as an additive in nutritional substances (food and/or feed) to give such substances a better nutritional value, and it may thereby represent a substantial improvement for the industrial user. To improve the stability of the oil and/or the proteins, antioxidants may also be added in the raw material and/or in the refined material.

Likewise the quality of the oil produced according to the present invention is an excellent starting point for using the oil in other areas, e.g. by using the oil as a raw material in enzymatic esterification (concentration, inter-esterification, construction of novel triglycerides with a defined composition of the fatty acids ("structured lipids")). With a low degree of oxidation the lipids produced according to the present invention represents a unique basic material, and the oil thus obtained may accordingly withstand a greater degree of handling and processing without this having large consequences for the quality of the end product.

Thus the oil per se produced by the process according to the present invention, also represents an aspect of the invention.

The process according to the invention is characterised by the steps, being performed subsequently to the freezing and the division and diminution of the pieces of biological material, of thawing the frozen and processed material and isolating the oil at a temperature where the proteins do not start to denature, said denaturing temperature being determined by a visual inspection of the oil where the maximum temperature is the temperature where proteins in the oil start to form agglomerates visible as strings or a precipitate in the oil.

Said maximum temperature is specific for the relevant organisms from which the oil is separated. As mentioned supra organisms from cold environments will normally have a lower maximum isolation temperature for the oil than organisms from a more temperate habitat. However, merely easy and simple ordinary tests obvious for the person skilled in the art are necessary to determine said maximum temperature. Examples of this is given infra.

As a preferred and optimum process, however, is a modified process to the one indicated supra. The modified process is one where there is taken account of the fact that the oil to be extracted from the biological material becomes more fluid the more elevated the temperature. Accordingly, there exists an optimal temperature for any given biological material where the proteins still are in their natural and undenatured state, but where the oil is as fluid as possible for cold extraction according to the process indicated supra.

When thawing the frozen and processed material there will exist a particular temperature above which the proteins in the material start to denature, as disclosed supra. This will normally be observed by the structure of the material changing from a composition where fat and proteins are kept in a structural mesh or array which normally exists in such a material, to pass over to a more liquid phase, whereafter the structure, at a given temperature dependent on the relevant species or organism from which the material is taken, quickly passes form being ordered to become more random since the structuring and holding mesh or array in the material becomes broken down when the proteins start to denature on account of the heat and on account of the increasing denaturing reactions occurring at elevated temperatures (see supra). It is presumed that this temperature, wherein fat/proteins are not exposed to any significant denaturing, lies within the interval 0-60° C., but it will be an easy matter for the person skilled in the art to determine the specific denaturing temperature for the relevant biological material both by observation (see supra) and by optionally measuring the viscosity of the relevant raw material and/or of the fatty phase. When separating fat and protein from the rest of the biological material in the process according to the invention, it is required that the lipids at the relevant temperature (below the denaturing temperature for the proteins) is in a liquid state so that non-denatured proteins and fat/oil may be separated from the material in a per se conventional manner.

When determining the optimum temperature for extracting the oil according to the inventive process, if such an extraction is performed by using a two-phase or three-phase separator, the heat provided by the separator will have to be included in the estimation of the highest temperature to use for the relevant biological material.

Since the extraction of the oil according to the invention is performed at a temperature below the denaturing temperature of the proteins of the material, a subsequent step may be performed for isolating the relevant proteins from the oil. Examples of such proteins (or other essential nutritionals or trace materials) are given supra, and it may especially be mentioned protein extracts from soy beans or other sources as interesting materials to be isolated by the process according to the invention.

As an alternative it may also be possible to perform the diminuition/mechanical processing of the biological material prior to the freezing of the material.

Fat with a high degree of unsaturation has a low melting point, and the process according to the present invention is accordingly especially suited for isolating/extracting raw material which is rich in this kind of fat/oil. Specific examples of such biological materials are cod liver, soy beans, sunflower seed, olive seed, as well as algae and other microorganisms.

In a traditional extraction of fat from raw materials as indicated supra, there is commonly used high temperatures in the raw material for extracting the fat, and the remaining material (the grax) will comprise inter alia denatured proteins, and under this denatured binding tissue. This grax has, however, a poor nutritional value as a source for proteins on account of a poor digestibility. An alternate method for extracting fat at low temperatures, and especially one where the main part of the proteins are not denatured, gives a grax with a far better nutritional value. At such a low temperature process the proteins are not denatured and the oxidation of the lipids is restricted or inhibited. Such a grax will accordingly be a good source for different proteins, and the grax produced according to the present invention may thus be used as a nutritional substance per se, or may be used further as a raw material for isolation of proteins or trace elements which did not pass into the fatty phase.

In an optional and preferred process it is possible to separate the freezing and thawing sections of the biological starting material so that the freezing and thawing processes may be performed continuously.

The invention will infra be disclosed through simple and non-limiting examples.

EXAMPLE 1

500 kg cod liver was frozen in a plate freezer to a core temperature of −22° C. The liver was then crushed in a mill and ground to a particle size of about 0.5 cm. The liver was then treated in a pump and further transported in a heat exchanger where the frozen material was thawed to a temperature of 28° C. and then pumped into a three phase separator.

Oil was isolated via the light phase and the protein mass was isolated via the heavy liquid phase exiting the separator. The yield was measured to be 52% w/w of the oil and the rest was isolated as a proteinaceous phase.

EXAMPLE 2

Cod liver (3.5 kg) was frozen like in Example 1 and treated similarly up to the heating sequence. In this example the liver material was thawed to 10° C. and them pumped to the separator. Subsequently the temperature was increased to 15° C., 20° C., 25° C., 30° C. and up to 40° C. The yield of oil was recorded at representative temperatures during the heating process to obtain the optimum temperature at which to separate the relevant phases. As another item to take into consideration is also the capacity of the separator to be used in the process. Since the process according to the invention is performed at relatively low temperatures, the speed of the separator will have to be reduced to obtain the improved product according to the invention. The optimal speed versus temperature for the relevant separator within the separation parameters according to the invention may also be determined by performing a similar test.

The following results were obtained:

TABLE 1

| Temperature | Result (kg/h) |
| --- | --- |
| 10 | 150 |
| 20 | 400 |
| 25 | 500 |
| 28 | 600 |
| 31 | Sep. problems, poor yield |
| 40 | No separation |

EXAMPLE 3

The proteinaceous phase from Example 1 was examined for its functional valuable properties. A representative sample of about 7 kg was removed from the relevant phase. The sample was homogenized with water in a 1:1 ratio and the pH was adjusted to pH 9 and centrifuged to concentrate the proteinaceous phase. The water soluble proteins were removed in the supernatant from the centrifuging (herein called the protein extract).

The non-water soluble pellet was discarded.

A sample of about 7 kg from the proteinaceous phase from Example 1 was also taken out and lyophilised (infra called lyophilised protein).

The functional properties from each of the relevant materials (the protein extract and the lyophilised protein) were examined and compared with two different samples of commercial casein (EM7 and EM65). The results are given in table 2.

Emulsifying properties:

TABLE 2

| Sample | Emulsifying activity | Emulsifying stability (%) |
| --- | --- | --- |
| Protein extract | 0,408 | 64 |
| Lyophilised protein | 0,335 | 57 |
| EM7 (comm. casein) | 0,336 | 69 |
| EM65 (comm. casein) | 0,378 | 60 |

The fat-binding properties of the material is given in Table 3 infra:

TABLE 3

| Sample | Fat-binding property (g fat/g protein) |
| --- | --- |
| Lyophilised protein | 4,5 |
| Protein extract | 4,4 |
| EM7/EM65 (comm. casein) | 2,0 |

The gel-forming properties of the material is given in Table 4 infra:

TABLE 4

| Sample | Viscosity prior to heating | Viscosity after heating and cooling |
| --- | --- | --- |
| Lyophilised protein (10%) | Thin paste | Firm gel |
| Protein extract (10%) | Thin paste | Firm gel |
| Lyophilised protein (5%) | Liquid dispersion | Firm gel |
| Protein extract (5%) | Liquid dispersion | Intermediate between thick paste and a gel |
| Protein phase (raw) | Liquid dispersion | Firm gel |

EXAMPLE 4

3500 kg cod liver was frozen to −11° C., treated in a mill, pumped through a heat exchanger and thawed to a temperature of 27° C. The liver material was then separated as in Example 1, and the oil phase was removed and measured for quality. The elements in the oil are indicated in Table 5 infra.

TABLE 5

| Analysis | Result |
| --- | --- |
| Free fatty acids (%) | 09 |
| Peroxide number (meq/kg) | 1,0 |
| Anisidine value | 0,6 |

EXAMPLE 5

The oil from Example 4 was subsequently refined, deodorized and added a commercial antioxidant (tocopherol-mixture). The elements in the oil after this treatment is given in Table infra.

TABLE 6

| Analysis | Result |
| --- | --- |
| Free fatty acids (5) | 0,06 |
| Peroxide number (meq/kg) | 0,4 |
| Anisidine value | 0,6 |
| Taste and smell | Neutral |

Subsequently the oil was mixed in a liquid condition into a nutritional substance such as bread (0.6%) and margarine (5%).

All of the applications created taste-neutral products which in a sensoric panel were impossible to distinguish from the reference samples.

EXAMPLE 7

Frozen cod liver (2 kg) was milled and heated in intervals, and was centrifuged in a laboratory scale centrifuge. The yield of the oil phase was measured and the content of vitamin A was measured in the oil. The yield of the oil in % versus the temperature is given in Table 7 that shows that the yield passes through a minimum at a temperature of about 35-45° C. The corresponding measured data for the yield as well as the data for the content of vitamin A in the oil are given in Tables 7 and 8 infra.

TABLE 7

Yield of the oil versus temperature

| Temp. | 10 | 20 | 30 | 40 | 50 | 60 | 70 | 80 | 90 |
| --- | --- | --- | --- | --- | --- | --- | --- | --- | --- |
| Yield oil (% w/w) | 62 | 63 | 45 | 34 | 54 | 58 | 60 | 63 | 65 |

TABLE 8

Content of vitamin A found in the isolated oil.

| Temp ° C. | 20 | 40 | 50 | 65 | 80 | 95 |
| --- | --- | --- | --- | --- | --- | --- |
| Vit. A (µg /g) | 529 | 522 | 518 | 513 | 494 | 402 |

EXAMPLE 8

Cod liver material was processed as in Example 1. On material from a separation on an industrial scale, there were performed tests on frozen ground liver, separated oil and the protein phase from the separator concerning the viscosity as a function of the time and the temperature. The results are given in table 9 infra.

TABLE 9

| Temperature ° C. | Cod Liver Protein Viscosity cp | Cod Liver Viscosity cp | Temperature ° C. | Cod Liver Oil Viscosity cp |
| --- | --- | --- | --- | --- |
| 10 | 510 | 2000 | 0 | 228 |
| 15 | 450 | 1700 | 10 | 108 |
| 20 | 390 | 890 | 20 | 69 |
| 30 | 260 | 600 | 30 | 56 |
| 40 | 165 | 520 | 40 | 46 |
| 50 | 203 | 600 | 50 | 38 |
| 60 | 335 | 560 | | |
| 70 | 575 | 500 | | |
| 80 | 1000 | 200 | | |

The invention claimed is:

1. An improved separation process for production of oil from a biological material, the process comprising the steps of:
   freezing the biological material such as to make membranes surrounding cells in the frozen biological material brittle and rupture to liberate contents of the cells wherein the freezing step the biological material is frozen to a temperature of 0° C. to −50° C. wherein the freezing step is performed at a rate of about −1° C./minute;
   treating mechanically the frozen biological material to produce particles having a mean particle diameter not exceeding 50 millimeters wherein the step of treating mechanically of the material is at least one of the group consisting of grinding, milling, chopping and pressing;
   thawing the treated biological material to a first temperature wherein the thawing step is performed using heating selected form the group consisting of microwave heating, heat exchanging heating, infra-red heating, and electric conduction heating;
   separating oil from the thawed biological material at the first temperature;
   recording a first yield of oil from the thawed biological material at the first temperature;
   warming the treated biological material to another temperature;
   isolating oil from the thawed biological material at the another temperature;
   recording another yield of oil from the thawed biological material at the another temperature; and
   obtaining an optimum temperature at which to separate oil from the biological material by considering factors selected from the group consisting of oil yields, peroxide concentration numbers, percentages of free fatty acid, vitamin A concentrations, viscosity and anisidine values,
   wherein the biological material is selected from the group consisting of fish liver, whale blubber, soy beans, sunflower seeds, olive seeds, and corn seeds.

2. The process according to claim 1, further comprising the steps of:
   adding a pre-treatment compound to the material prior to mechanically treating the material, wherein said pre-treatment compound is at least one of the group consisting of an enzyme, a solvent, an emulsion-bursting material, and an emulsion-inhibiting solution, wherein the enzyme is selected from the group consisting of cellulase, collagenase and lysozyme. wherein the solvent is hexane, wherein the emulsion-bursting material is salt;

avoiding forming three phases in which the three phases comprise a proteinaceous phase, a free water phase, and an oil phase;

determining a denaturing temperature by visually inspecting the oil for visible stringy agglomerates and agglomerate precipitates refining the oil;

deodorizing the oil; and adding an antioxidant containing tocopherol to the oil.

* * * * *

UNITED STATES PATENT AND TRADEMARK OFFICE
CERTIFICATE OF CORRECTION

| | | |
|---|---|---|
| PATENT NO. | : 7,718,195 B1 | Page 1 of 1 |
| APPLICATION NO. | : 09/807704 | |
| DATED | : May 18, 2010 | |
| INVENTOR(S) | : Stig Jansson et al. | |

It is certified that error appears in the above-identified patent and that said Letters Patent is hereby corrected as shown below:

Title page, Item (75) Inventors, "Sildråpeveien (NO)" should be --Trondheim (NO)--;

Title page, Item (75) Inventors, "Grimsbyveien (NO)" should be --Tromsø (NO)--;

Col. 10, Claim 1, line 8, "0° C. to -50° C." should be --0° C to -50° C--;

Col. 10, Claim 1, line 10, "C./minute" should be --C/minute--.

Signed and Sealed this
Seventh Day of August, 2012

David J. Kappos
*Director of the United States Patent and Trademark Office*